UNITED STATES PATENT OFFICE.

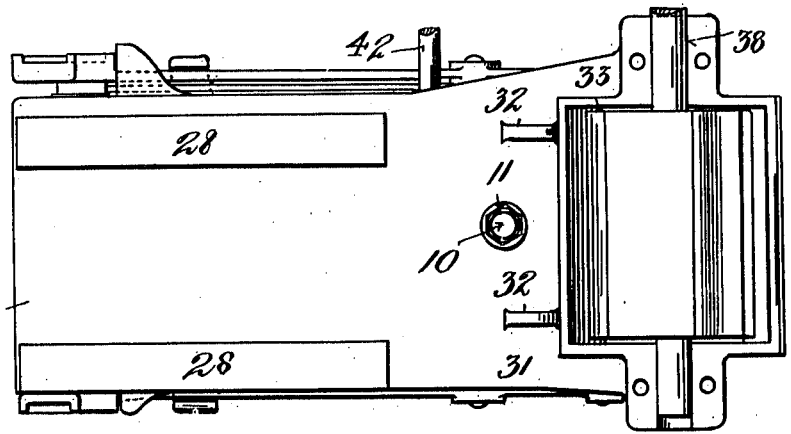
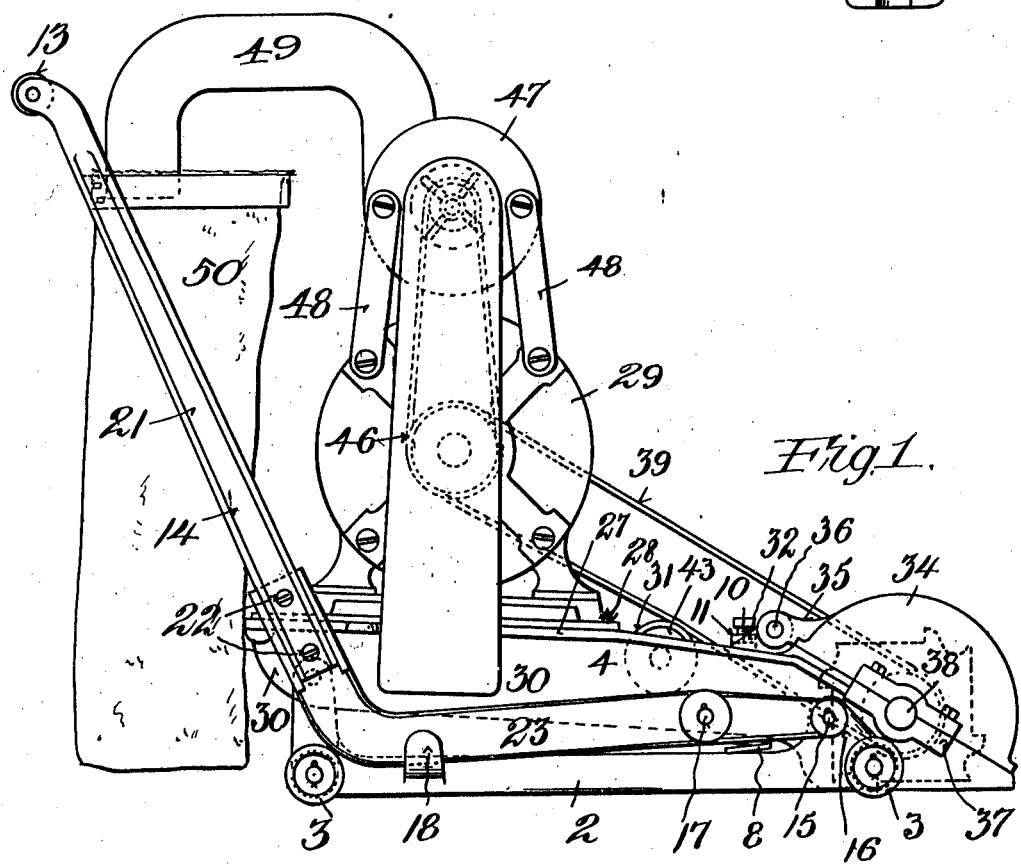

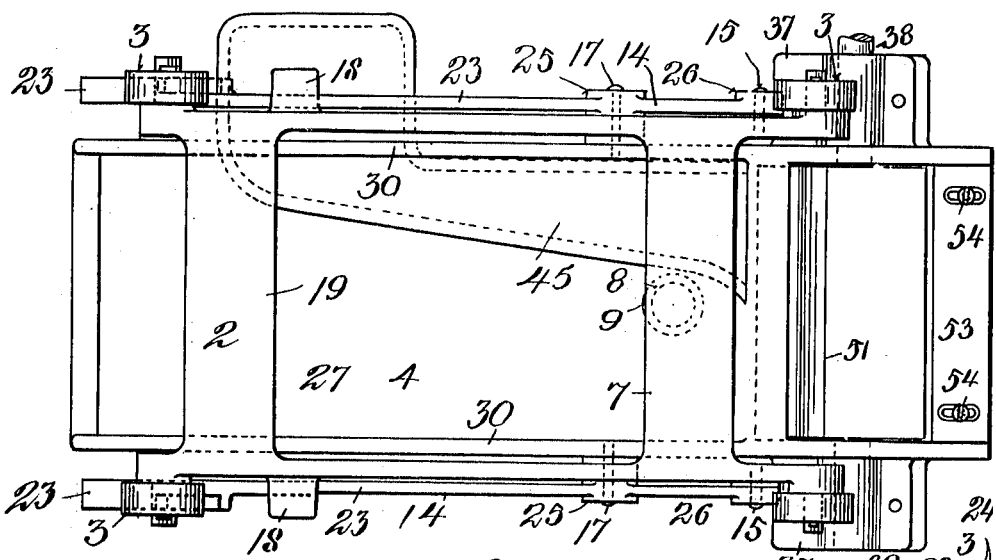
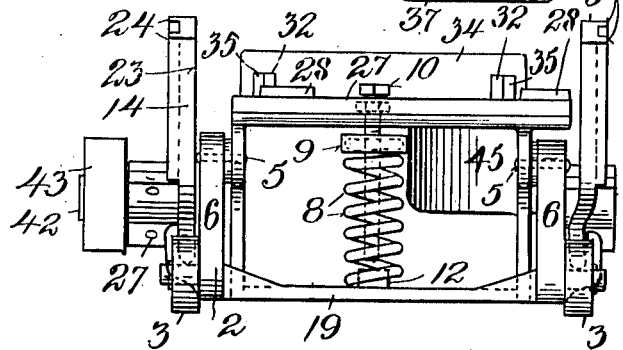
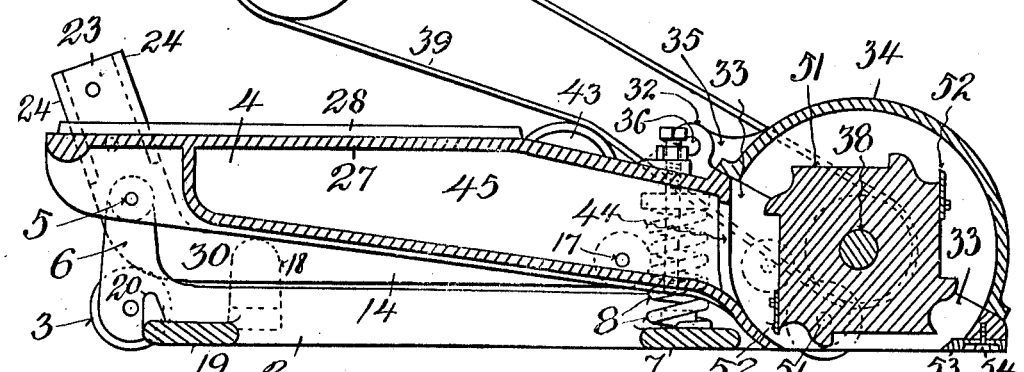

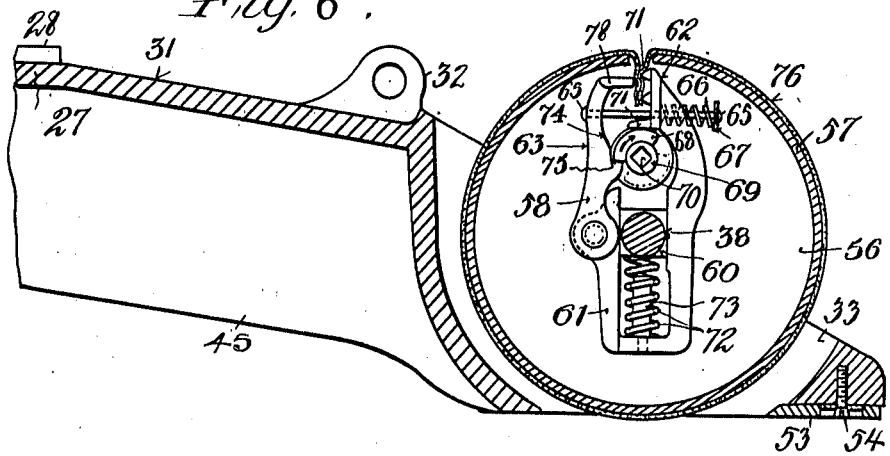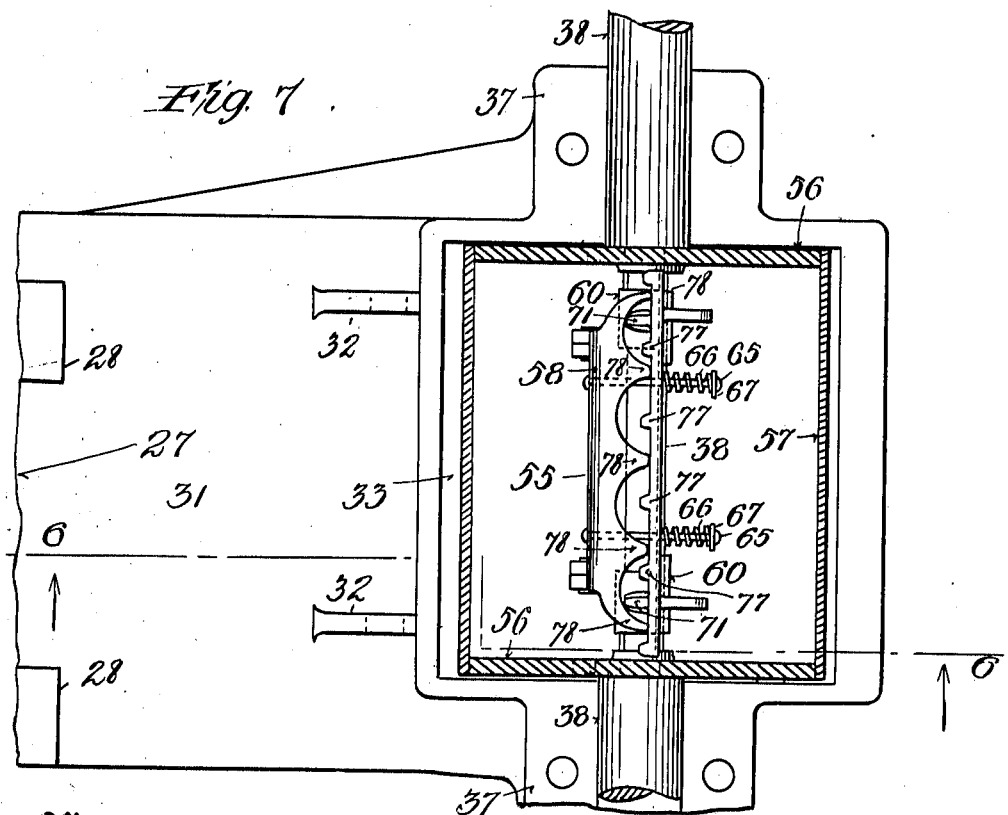

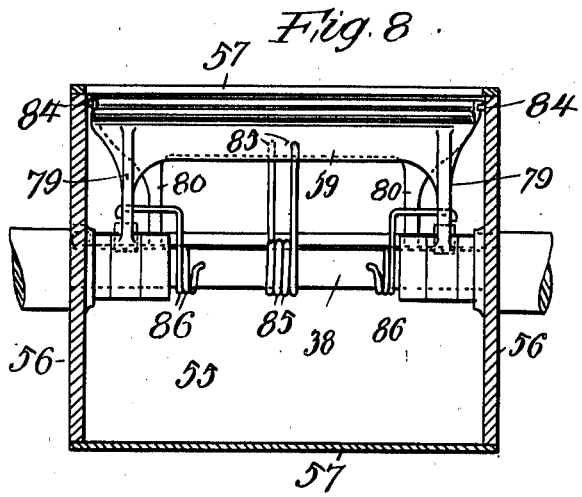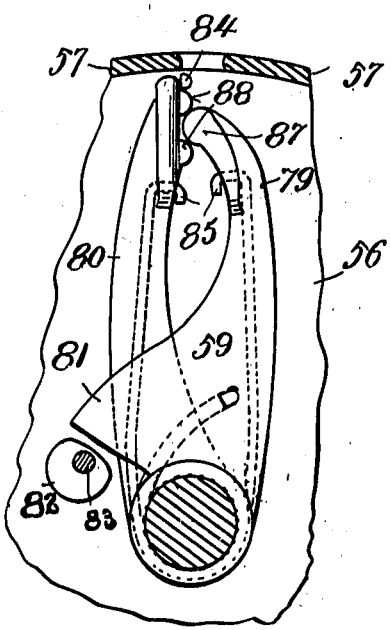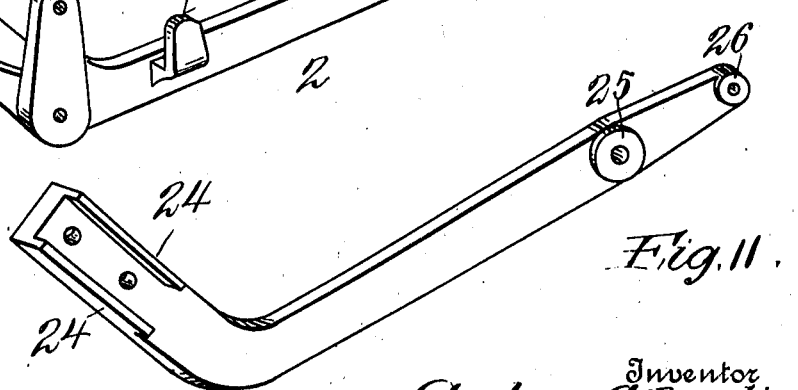

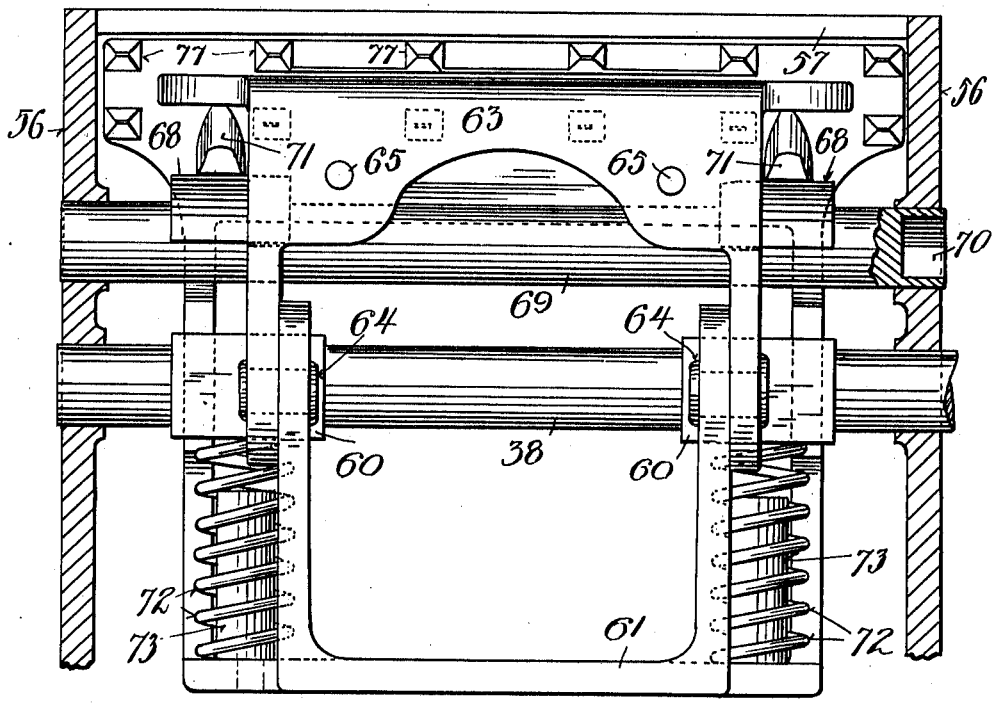
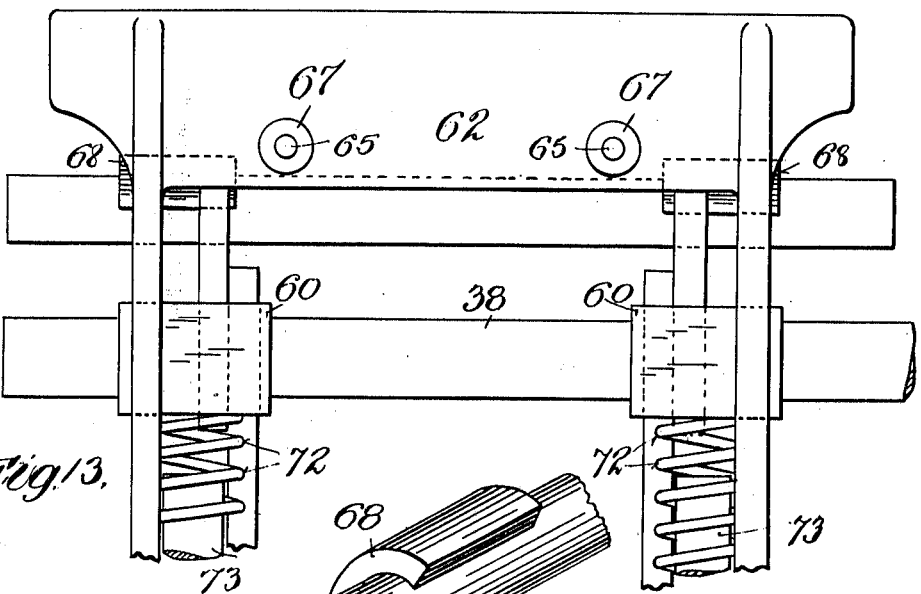

ANDREW A. BAGALIO, OF NEW YORK, N. Y., ASSIGNOR, BY MESNE ASSIGNMENTS, TO ANDREWS FLOOR PLANING AND SURFACING COMPANY, OF NEW YORK, N. Y., A CORPORATION OF NEW YORK.

FLOOR-SURFACING MACHINE.

982,759.      Specification of Letters Patent.      Patented Jan. 24, 1911.

Application filed March 18, 1910. Serial No. 550,221.

*To all whom it may concern:*

Be it known that I, ANDREW A. BAGALIO, a subject of the King of Italy, and a resident of 467 East One Hundred and Sixtieth street, New York city, county of New York, and State of New York, have invented a new and useful Improvement in Floor-Surfacing Machines, of which the following is a specification.

The object of my invention is to provide a machine of this class which will be simple, durable and efficient, and which may be either used for planing, sand-papering, rubbing or polishing the surface of a floor, regardless of the direction of the grain of the wood. This object is accomplished by my invention, some embodiments of which are hereinafter set forth.

For a more particular description of the same, reference is to be had to the accompanying drawings, forming a part hereof, in which:—

Figure 1 is a side elevation of my improved machine. Fig. 2 is a plan view of the bottom portion of the same. Fig. 3 is an inverted plan view of the structure shown in Fig. 2. Fig. 4 is a front end view of the bottom portion of the machine, parts being omitted. Fig. 5 is a longitudinal sectional view of the structure shown in Fig. 1 with parts omitted. Fig. 6 is a sectional view taken on the line 6—6 of Fig. 7, looking in the direction of the arrows. Fig. 7 is a plan view partially in section of the sand papering roller and its supporting parts. Fig. 8 is a longitudinal section of a modified form of grippers in a sand papering roll. Fig. 9 is an enlarged sectional view of the grippers shown in Fig. 8. Fig. 10 is a perspective view of the carriage frame. Fig. 11 is a perspective view of a lever to which the handle is secured. Fig. 12 is a view of a portion of the structure shown in Fig. 6. Fig. 13 is a reverse view of the same. Fig. 14 shows a detail of construction.

Throughout the various views of the drawings, similar reference characters designate similar parts.

The machine 1 is provided with a frame 2 carried by suitable rollers 3 and to which is pivoted the bed 4 by suitable pivots 5 near the top of projections 6 that are carried on rear of the frame 2 and at each side thereof. The forward end of the bed 4 extends beyond the frame 2 and is supported from a crossing 7 of the frame 2 on which is supported spring 8 which has a cap 9 at its upper end, on a screw 10 that may rest on the crossing 7 and is preferably provided with a lock nut 11 whereby the exact position of the screw 10 may be determined and fixed. The coiled spring 8 surrounds a stud 12 which rises from the crossing 7 and on which the screw 10 is mounted. The strength of the spring 8 is such that the bed 4 is carried sufficiently high to make the cutter or abrading roller clear the floor except when forced against the same by means described below. The exact amount of cutting is determined by adjusting the screw 10, so that its lower end will rest on the stud 12 when the machine is operating, but not at other times.

The mechanism for forcing the rotary cutting or abrading mechanism into contact with the floor, when the machine is in operation, consists of a handle 13 uniting two bent levers 14, made substantially as shown in Fig. 1, and each is fulcrumed at its forward end on a pin 15 secured in an upright 16 of the frame 2. The levers 14 are provided with large pivots 17 that extend laterally from the bed 4 so that the levers 14 are of the second order and by the pressing of these levers through the handle 13, the spring 8 is compressed and the bed 4 is lowered. When the downward pressure is removed from the handle 13, the spring 8 is sufficiently strong to elevate the forward end of the bed 4 and thereby raise the cutting or operating mechanism from its operative position. The frame 2 is provided with suitable and upwardly extending ears 18 which rest against the outside of the levers 14 and serve to guide the same and keep these levers from becoming displaced while the machine is trundled about during its use.

The frame 2 is provided with a crossing 19 at its rear which preferably has an upwardly extending flange 20 to stiffen and strengthen the structure.

Each lever 14 may be made in any suitable way but is preferably made in two parts, the part 21 being the upper and straight part which is bent slightly to the rear at its upper end where it adjoins the handle 13 and at its lower end it is secured by screws 22 to the bent portions 23 of the lever 14. The bent portion of each has flanges 24 between which the part 21 is fitted and its forward end is provided with suitable bosses 25 and 26 to receive the pivots 17 and 15 respectively.

The bed 4 is provided with a horizontal top 27 with parallel and machined surfaces 28 that are adapted to carry a motor 29 in the conventional manner. This bed 4 is also provided with longitudinally extending and vertically disposed webs 30 from which extend the pivots 15 and 17, two of these webs being employed, one at each side.

A surface 31 runs at a slight angle to the portion 27 and rests on the webs 30 and this surface 31 runs to the portion which surrounds the cutting or abrading member which will be described below. The surface 31 is provided with the upwardly and longitudinally extending ears 32 which are adjacent to the opening 33 in which the operating mechanism is located. A cover 34 covers this opening and has ears 35 supported by pivots 36 that run from the ears 32 so that the cover 34 may be raised and thrown back clear of the cutting or abrading mechanism which it normally conceals, whenever desired.

The ends of the opening 33 are provided with suitable bearings 37 that receive the shaft 38 of the abrading or cutting mechanism. This shaft 38 is extended and provided with a pulley from which runs a belt 39 from the pulley 40 on the armature shaft 41 of the motor 29. A stud shaft 42 carries an idle roller 43 which rests against the belt 39 and prevents it from slipping. The idle roller 43 may be mounted in any other suitable manner, if desired.

The rear of the opening 33 is provided at one side with a vertically disposed opening that runs into a passage 45 surrounded by suitable walls. This passage is carried through one of the webs 30 and connects with a vertically disposed tubing 46 that runs to the fan 47 mounted on the motor 29 by suitable supports 48. The fan 47 is of the conventional kind and driven by a belt shown in dotted lines in Fig. 1, in the conventional manner, as by the pulley 40, or else next to another pulley on the armature shaft 41. The fan 47 forces the products received from the tubes 46 into a tube 49 that runs to a bag 50 where the sawdust or shavings are deposited.

The shaft 38 may carry a cutter head 51 of the conventional form. This cutter has blades 52 that run near a knife 53 fixed adjustably on the under surface of the bed 4 and below the opening 33, as shown. It is held by cap screws 54 or other suitable means. The cutter is used for the rough work of the machine. When the work of a finer character is to be done, the shaft 38 and the cutter 51 are removed and a second shaft 38 is substituted that carries a sand papering roll 55. This roll is composed of disks 56 which carry a cylindrical shell 57 whose ends are separated to permit sand paper to be passed therethrough at its ends where it is held by jaws 58 or 59, two forms of jaws being shown and the preferred embodiment of my invention is the form shown in Figs. 6, 7, 12, 13 and 14. In this embodiment of my invention the shaft 38 has two squared portions 60 against which rests a casting 61 which has one of the jaws 62 and to which the other jaw 63 is secured by pivots 64 and small bolts 65 each of which is surrounded by coiled springs 66 at one end. These springs 66 engage the jaw 62 and nuts 67 on the bolts 65 and normally force the jaws 62 and 63 together so that when these jaws are separated, they are separated by cams 68 on a shaft 69 pivoted in the disks 56. This shaft 69 has a suitable recess 70 which is adapted to receive a key through which it may be rotated. The cams 68 are preferably segments of cylinders, as shown, extending about 120° and these engage lugs 71 on the jaw 62 and thus raise the casting 61 against the tension of coiled springs 72 resting on the bottom of the casting 61 and surrounding lugs 73. As the cams 68 are further turned, they next, after raising the jaws 58, engage surfaces 74 on the jaw 63 and force this jaw from the jaw 62, against the tension of the springs 66 and this continues until these cams 68 reach stops 75 on the jaw 63 at which time the jaws 62 and 63 are sufficiently opened to permit the ends of the sand paper 76 to be inserted. When the movement of the cams is reversed, the jaws 62 and 63 close on the sand paper 76 and grip the same firmly with the aid of projections 77 on the jaw 62 and 78 on the jaw 63, and as these cams are further turned, the lugs 71 are cleared and then the springs 72 act to draw down the jaws 58 and thereby draw the paper 76 tight on the surface 57 and keep it so regardless of the amount of stretching while in use. By again reversing the movement of the cams 68, the paper 76 may be released and replaced from time to time, as desired. The casting 61 is so shaped as to ride true on the parts 60 of the shaft 38 and is preferably shaped as shown.

The jaws 59 are different. They are pivoted on the shaft 38, one jaw 79 being shorter than the other jaw, 80, and provided with projecting portions 81 adapted to engage eccentrics 82 on a shaft 83 mounted in the disks 56. These disks 56 also carry pins 84 which limit the movement of the jaw 80 in one direction. A coiled spring 85 surrounding a portion of the shaft 38 holds the jaws together or tends to hold them so. A second set of coiled springs 86 forces the jaws in the direction of the eccentrics 82. These springs are mounted with their ends secured, as shown, so that a further description of the springs is unnecessary. The jaw 79 is provided with a rounded end 87 that is adapted to fit between ridges 88 on the jaw 80, so that when the sand paper is placed in between the jaws, in the conventional manner, the jaws will grip and hold the same, and the springs 86 will then act to pull the paper taut. The jaws are separated by the eccentric 82 which is turned so as to strike the projection 81 and force the jaw 79 from the jaw 80, at which time, ends of the sand paper may be either removed or inserted, as desired. The pins 84 limit the movement of the jaw 80 in the direction of the jaw 79.

From the foregoing, the operation of my improved machine will be readily understood. Assuming that the floor to be resurfaced is somewhat rough, the machine is rigged, as shown in Fig. 1, and properly connected to a source of electrical supply, not shown, which drives the motor 29 at a suitable speed, in the conventional manner. This motor, so driven, drives the belt 39 which drives the shaft 38 which in turn drives the rotary cutter 51 at a high rate of speed, and the knife 53 is suitably adjusted so as to coöperate with the knives 52 to make a clean cut. During the cutting operation the knife 53 rests on the floor and thereby facilitates the cutting operation by steadying the machine. The bolt 10 is properly adjusted, if necessary, so as to permit the proper depth of cut. The machine is then moved to the proper position on the floor and the handle 13 is then shifted down, as well as forward and this compresses the coiled spring 8 through the levers 14 and the machine is trundled forward on the wheels 3. The shavings are exhausted through the passage 45, tube 46, fan 47 and tube 49, and deposited in the bag 50. The machine is shifted over all parts of the floor that it can reach and these are surfaced by the rotary cutter so as to be in a suitable condition for the abrading mechanism described above. When the machine is stopped, the cutter 51 is removed and the abrading mechanism 55 is substituted. The bolt 10 is adjusted and the machine is again put in operation, the same as before, and the sand paper in driven at a high speed on the rotary cylinder 57 and held by the jaws 58 or 59, but preferably by the jaw 58, finishes the surface of the floor and renders the same fit to receive a coat of paint or varnish. From time to time the sand paper may be removed, as desired. The dust from the sand paper is exhausted through the passage 45, the same as the shavings from the rotary cutter 51. If the sand paper 76 is replaced by a cloth or similar substance, the rotary member may be used for polishing, or a polishing tool may be substituted for the rotary member.

While I have shown and described several embodiments of my invention, it is obvious that it is not restricted thereto, but is broad enough to cover all structures that come within the scope of the annexed claims.

What I claim is:

1. A floor planer comprising a frame, a tool bed pivoted to said frame and having tool shaft bearings projecting forward of the end of said frame to engage the floor in advance of said frame, and also having a substantially flat upper surface in combination with a tool head mounted on a shaft in said bearings and a motor mounted on said surface and a lever projecting rearwardly from said frame and affording a means for pushing the machine forward to its work and pivotally connected to both the bed and frame, whereby the bed may be tilted on the frame to govern the amount of projection of the tool below the frame.

2. A floor planer comprising a frame, a tool bed pivoted to the said frame and having tool shaft bearings projecting forward of the end of said frame to engage the floor in advance of said frame, and also having a substantially flat upper surface in combination with a cutter head mounted on said shaft in said bearings and a motor mounted on said surface and a lever projecting rearwardly from said frame and affording a means for pushing the machine forward to its work and pivotally connected to both bed and frame whereby the bed may be tilted on the frame to govern the amount of cutting of the tool below the frame and a knife carried by said bed adjacent to the rotary cutter to coöperate with the same to make a clean cut.

3. A traveling floor planer comprising a bed and movable means for supporting the same, a cutter head mounted to rotate in said bed, blades on said cutter head, a fixed blade carried by said bed and adapted to rest on the floor while it is being surfaced and to coöperate with the blades on said cutter head, whereby a clean cut may be made by coöperation of the blades, and means for driving said cutter ahead.

ANDREW A. BAGALIO.

Witnesses:
O. E. EDWARDS, Jr.,
GUSTAVE I. ARONOW.